April 19, 1938.　　　A. E. LEFIELL　　　2,114,929
CARCASS CARRIER
Filed Oct. 10, 1934
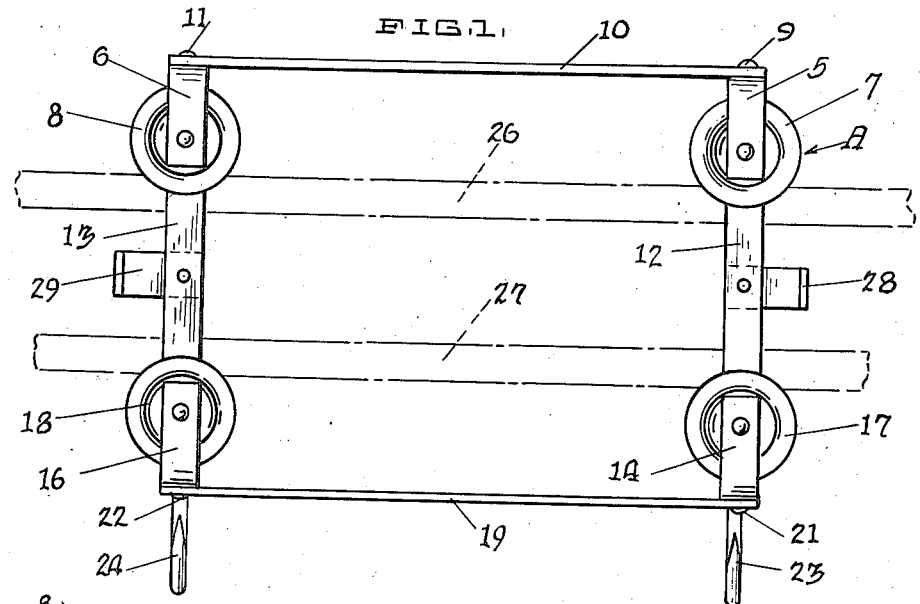
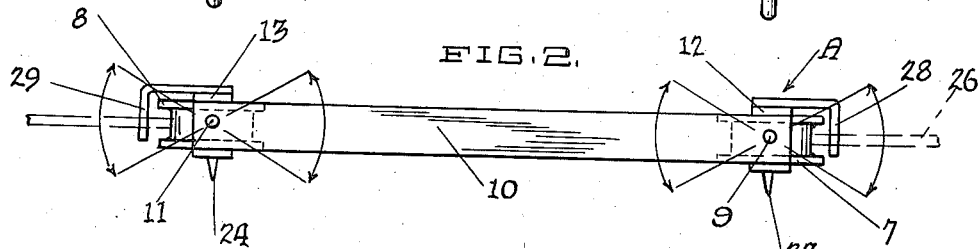
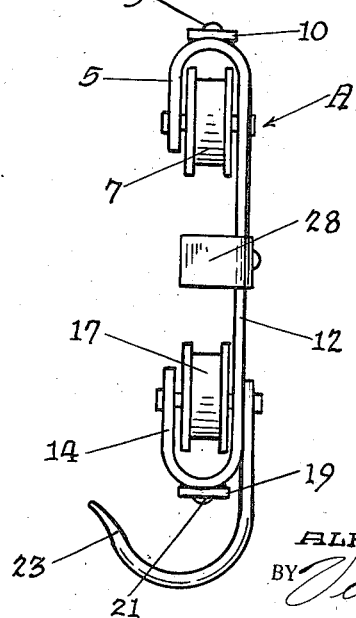
INVENTOR.
ALFRED E. LEFIELL.
BY
ATTORNEYS.

Patented Apr. 19, 1938

2,114,929

UNITED STATES PATENT OFFICE 2,114,929

CARCASS CARRIER

Alfred E. Lefiell, San Francisco, Calif.

Application October 10, 1934, Serial No. 747,769

3 Claims. (Cl. 17—44)

This invention relates to a carrier for rail conveyors and has particular reference to a device for hanging sheep, pigs and the like during the skinning and cleaning process.

The principal object of the invention is to produce a carrier which will hold the legs of the animal spaced apart and one which will be rigid with relation to the rails so that the operator may work rapidly upon the carcass of the animal.

A further object is to produce a device which is economical to manufacture, strong and one which will stand a considerable amount of abuse incident to devices of this character.

Other objects and advantages will be apparent during the course of the following description.

In the accompanying drawing forming a part of this specification and in which like numerals are employed to designate like parts throughout the same, Fig. 1 is a side elevation of the carrier as it would appear upon the rails and in position for use;

Fig. 2 is a plan view thereof; and

Fig. 3 is an end elevation of the same.

In slaughter houses it is common to kill the animal and then hang said animal upon a rail through the medium of a single wheel and a hook suspended therefrom, the wheel running upon the rail, and this arrangement is such that there is little stability, the animal swinging and moving under the track. In order to overcome this difficulty I have provided a carrier consisting of spaced wheels, which travel below and above the track and support spaced hooks. This carrier is designated as a whole, in Figs. 1, 2, and 3 by the letter A.

Referring specifically to these figures, the carrier comprises a pair of bars 12 and 13 the upper portions of which are formed into yokes 5 and 6 in which wheels 7 and 8 are rotatably mounted. These yokes are in turn pivoted as shown at 9 and 11, respectively, to a spacer 10. Referring to Figs. 1 and 3 it will be noted that the bars are each bent upwardly as shown at 14 and 16 so as to rotatably support lower wheels 17 and 18. A spacer bar 19 is pivoted as at 21 and 22. In Figure 2, the curved arrows are intended to indicate the swing of the wheels about the axes of the members 12 and 13. Hooks 23 and 24 are secured to the downwardly extending portions 12 and 13. It will be noted that each of the wheels 7, 8, 17 and 18 is flanged so as to engage the upper or lower surface, respectively, of the rails 26 and 27, and when once placed upon the rails up and down movement of the carrier is completely eliminated. Also the spacing of the wheels definitely positions the hooks 23 and 24 a distance apart which is correct for hanging the carcass. Therefore, a skinner may pull violently on the skin without the animal swinging, which is a very important feature in this business. Bumpers are shown at 28 and 29 so that adjacent carriers will not have their wheels in engagement with each other.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a carrier of the class described, in combination with spaced tracks and comprising a pair of spaced yokes, flanged wheels mounted therein, a spacer pivotally secured to each of said yokes, a second pair of wheels of equal diameter pivotally mounted beneath said first mentioned wheels, suspended hooks secured to said carrier at the lower ends of said yokes, and bumper elements secured to said yokes.

2. In a carcass carrier of the class described capable of being suspended from spaced tracks and including a supporting frame embodying spaced yokes pivotally mounted relative to each other, flanged pairs of wheels of equal diameter mounted in each of said yokes, and carcass carrying hooks arranged at the lower ends of each of said yokes.

3. In a carcass carrier of the class described capable of engaging spaced tracks and including a supporting frame embodying spaced yokes pivotally mounted relative to each other, pairs of wheels of equal diameter rotatably mounted in said yokes and adapted to swivel as to relative pairs, carcass carrying hooks mounted at the lower ends of said yokes, and bumpers mounted on said yokes and arranged intermediate the wheels of each pair.

ALFRED E. LEFIELL.